United States Patent
Bishop et al.

(10) Patent No.: US 9,477,877 B2
(45) Date of Patent: Oct. 25, 2016

(54) ASSET SECURITY MANAGEMENT SYSTEM

(71) Applicant: Landis+Gyr Innovations, Inc., Alpharetta, GA (US)

(72) Inventors: David Anthony Bishop, Woodstock, GA (US); Ruben E. Salazar Cardozo, Johns Creek, GA (US)

(73) Assignee: Landis+Gyr Innovations, Inc., Alpharetta, GA (US)

( * ) Notice: Subject to any disclaimer, the term of this patent is extended or adjusted under 35 U.S.C. 154(b) by 125 days.

(21) Appl. No.: 14/448,091

(22) Filed: Jul. 31, 2014

(65) Prior Publication Data

US 2016/0034750 A1    Feb. 4, 2016

(51) Int. Cl.
| | |
|---|---|
| *G06K 9/00* | (2006.01) |
| *G06F 21/32* | (2013.01) |
| *G08B 13/196* | (2006.01) |
| *G07C 3/00* | (2006.01) |
| *G07C 9/00* | (2006.01) |

(52) U.S. Cl.
CPC ........... *G06K 9/00288* (2013.01); *G06F 21/32* (2013.01); *G06K 9/00771* (2013.01); *G07C 3/00* (2013.01); *G07C 9/00158* (2013.01); *G08B 13/19667* (2013.01); *G06T 2207/10004* (2013.01); *G06T 2207/30201* (2013.01); *G06T 2207/30232* (2013.01); *G07C 9/00166* (2013.01)

(58) Field of Classification Search
CPC ............. G06F 21/32; G06K 9/00288; G06K 9/00771; G06T 2207/10004; G06T 2207/30201; G06T 2207/30232; G07C 3/00; G07C 9/00158; G07C 9/00166; G08B 13/19667

USPC .......................................................... 382/118
See application file for complete search history.

(56) References Cited

U.S. PATENT DOCUMENTS

| | | | |
|---|---|---|---|
| 2003/0167153 | A1 | 9/2003 | Alexander |
| 2005/0169367 | A1 | 8/2005 | Venetianer et al. |
| 2009/0164680 | A1 | 6/2009 | Stobbe et al. |
| 2010/0111377 | A1 | 5/2010 | Monroe et al. |

FOREIGN PATENT DOCUMENTS

WO    2016018613    2/2016

OTHER PUBLICATIONS

PCT/US2015/040309, "International Search Report and Written Opinion", Oct. 29, 2015, 13 pages.

*Primary Examiner* — Manuchehr Rahmjoo
(74) *Attorney, Agent, or Firm* — Kilpatrick Townsend & Stockton LLP (57) ABSTRACT

Systems and methods for monitoring assets at a premises on a utility grid. Face print information is extracted from image data received. The face print information comprises an amount of data less than the amount of data comprising the image data of the face. Asset management information from an asset management system is also received. Multiple image data may be received and vector information is determined that corresponds to the trajectory of movement of a face. A security alert is generated by correlating the asset management information with the face print information and/or the vector information and transmitting in real time the security alert to a monitoring center. A security alert may also be generated from image data reflecting abnormal running conditions of a device. Security alerts would be of a size and format necessary for transmission on any existing network, including a narrow band network.

14 Claims, 4 Drawing Sheets

ASSET SECURITY MANAGEMENT SYSTEM

TECHNICAL FIELD

This disclosure relates generally to monitoring assets on a smart grid system and personnel accessing those assets.

BACKGROUND

The traditional electrical power grid is evolving into a smart grid. Smart grid integrates the traditional electrical power grid with information and communication technologies. Such integration empowers the electrical utilities providers and consumers, improves the efficiency and the availability of the power system while constantly monitoring, controlling and managing the demands of customers. A smart grid is a complex network composed of millions of devices and entities including substations, transformers, voltage regulators, switches, meters and other equipment connected on a network. Such a massive network comes with many security concerns and vulnerabilities.

A smart grid network includes many components and most of them are located in remote premises that are usually unattended which makes them vulnerable to physical access. Additionally the network used for communication between devices on the smart grid may have limited data capacity.

A security system is needed that provides security of any premises on the smart grid making use of the communication network already deployed to reach devices on the grid.

SUMMARY

Certain embodiments described herein provide methods and systems for monitoring assets such as components, devices, or equipment at premises throughout a smart grid. One exemplary computer implemented method comprises receiving image data by an onsite system located at a particular location or at one of the premises of a utility grid. The image data includes a face recorded by one or more cameras located on the same premises. Face print information is extracted from image data of the face. The face print information is less than an amount of data comprising the image data of the face.

Asset management information from an asset management system is also received by the onsite system. The asset management information includes usage and event data from devices on the network throughout the smart grid. The asset management information includes information from devices on the premises that may be connected using a narrowband network. The method involves generating a security alert by correlating the asset management information with the face print information and transmitting in real time the security alert to a monitoring center on the smart grid. The security alert is transmitted using any existing network deployed to communicate with devices on the smart grid. The existing network may be a narrow band network with very low bandwidth. The security alert generated would be of a size and format necessary for transmission on such a network.

Another exemplary embodiment further comprises receiving multiple image data from various cameras. First, image data which contains a face is received by the onsite system. A first location is determined associated with the image data. A second image data of the face is subsequently received and a second location is determined associated with the second image data. A vector is determined that corresponds to a trajectory from the first location to the second location and the vector information is included in the security alert. As the security alert is transmitted via an existing network that may have low bandwidth, the security alert generated is of a size and format necessary for transmission on such a network.

Another exemplary embodiment comprises receiving current image data of a visual output of a device located on the premises. Abnormal operation of the device may be determined by comparing the current image data to stored image data for a visual output of the device reflecting normal operation. A security alert is generated comprising the results of the comparison wherein an amount of data for the results of the comparison is less than an amount of data for the image data of the visual output. The security alert may be transmitted in real time to a monitoring center. The security alert is to be transmitted on an existing network and therefore needs to meet the requirement of size and format for transmission on such a network.

In other embodiments, a computer-readable medium (such as, for example, random access memory or a computer disk) comprises code for carrying out these methods.

These embodiments are mentioned not to limit or define the disclosure, but to provide examples of embodiments to aid understanding thereof. Embodiments are discussed in the Detailed Description, and further description is provided there. Advantages offered by the various embodiments may be further understood by examining this specification.

BRIEF DESCRIPTION OF THE FIGURES

These and other features, aspects, and advantages of the present disclosure are better understood when the following Detailed Description is read with reference to the accompanying drawings, where.

DETAILED DESCRIPTION

Smart grids provide a resource such as electricity from centralized distribution generation stations to customers through transmission and distribution systems. These transmission and distribution systems can be located at various sites and contain assets such as meters, routers, collectors and any other equipment that requires surveillance. A local onsite system operates at a site that houses the equipment required for a transmission system or a distribution system to operate. Cameras connected to the onsite system monitor the equipment located throughout the premises of the site. Video or images are captured by the cameras as image data and are provided to the onsite system. The image data is used by the onsite system to detect, identify, or track movement of personnel within the site. In another embodiment, the image data is used by the onsite system to determine abnormal operations of a device.

In one embodiment, the onsite system analyzes the image data to detect faces. If a face is detected, the onsite system extracts face print information from any face detected in the image data. The face print information comprises a digitally captured representation of a face that can be used for security purposes because it is as individual as a person's fingerprints. The digital representation of the face may be obtained by measuring nodal points of the face and determining a digital code which represents the face print. The nodal points may be, for example, the distance between the eyes, width of the nose, depth of eye sockets, length of jaw bone, etc. The face print information comprises an amount of data less than the image data. The onsite system may determine the identity of the face recorded by comparing the face print information extracted to a database of known faces. Identity of the face determines whether the face is of a known person. If the face is known, the database of known faces may provide identity information such as name, authorization and contact information.

The onsite system may also analyze image data to track movement of personnel within the site. Image data may be provided from one or more cameras to the onsite system. When the onsite system receives multiple image data that differs in location or time and the multiple image data displays the same face, the onsite system determines the location associated with each image data to track movement. A vector is determined that corresponds to the trajectory of movement of a person based on the different locations identified for each image data received. The vector provides information on the movement of the person. If the movement is determined to be towards assets that are monitored, a security alert may be generated to notify that a person is approaching monitored assets.

In another embodiment the onsite system may analyze image data of a visual output device (i.e. a screen, a meter panel, etc.) that is located on the premises. The onsite system stores image data of the visual output device that reflects normal operation. A camera provides current image data of the output device to the onsite system. The onsite system compares the current image data received to stored image data for the visual device to determine the operating condition of the device.

In addition to receiving image data from cameras, the onsite system also collects or receives asset management information. Asset management information includes asset management information such as status and event information for various assets throughout the smart grid including the assets on the premises. The asset management information may be received from assets on the premises. For example the assets on the premises may be on a local area network and may relay to the onsite system any status or event information. Alternatively or in addition to, asset management information may be received from an asset management system. The asset management system may be housed on the premises with the onsite system or may be located remotely.

The onsite system correlates the face print information and/or the vector information with asset management information and generates a security alert. The security alert is transmitted in real time to a monitoring center via an existing network that is used by the devices on the smart grid. The existing network may be a narrow band network and therefore the security alert must be generated by the onsite system to be a size appropriate for transmission on the band width of narrow band network.

As defined herein "assets" includes any device, component, or piece of equipment capable of performing functions related to the distribution and monitoring of a utility resource. An asset can be a meter or meters located at a facility that measures the consumption of a utility such as gas, water, or electric power. Other examples of assets include routers, collectors, host computers, hubs or any other device that facilitates the distribution and monitoring of a utility resource.

As defined herein "premises" includes any facility or property that houses assets that are under camera surveillance. Such premises may be a substation housing equipment for the transmission and distribution of a resource.

Security Alerts from Face Print Information or Trajectory of Movement

Figure 1:
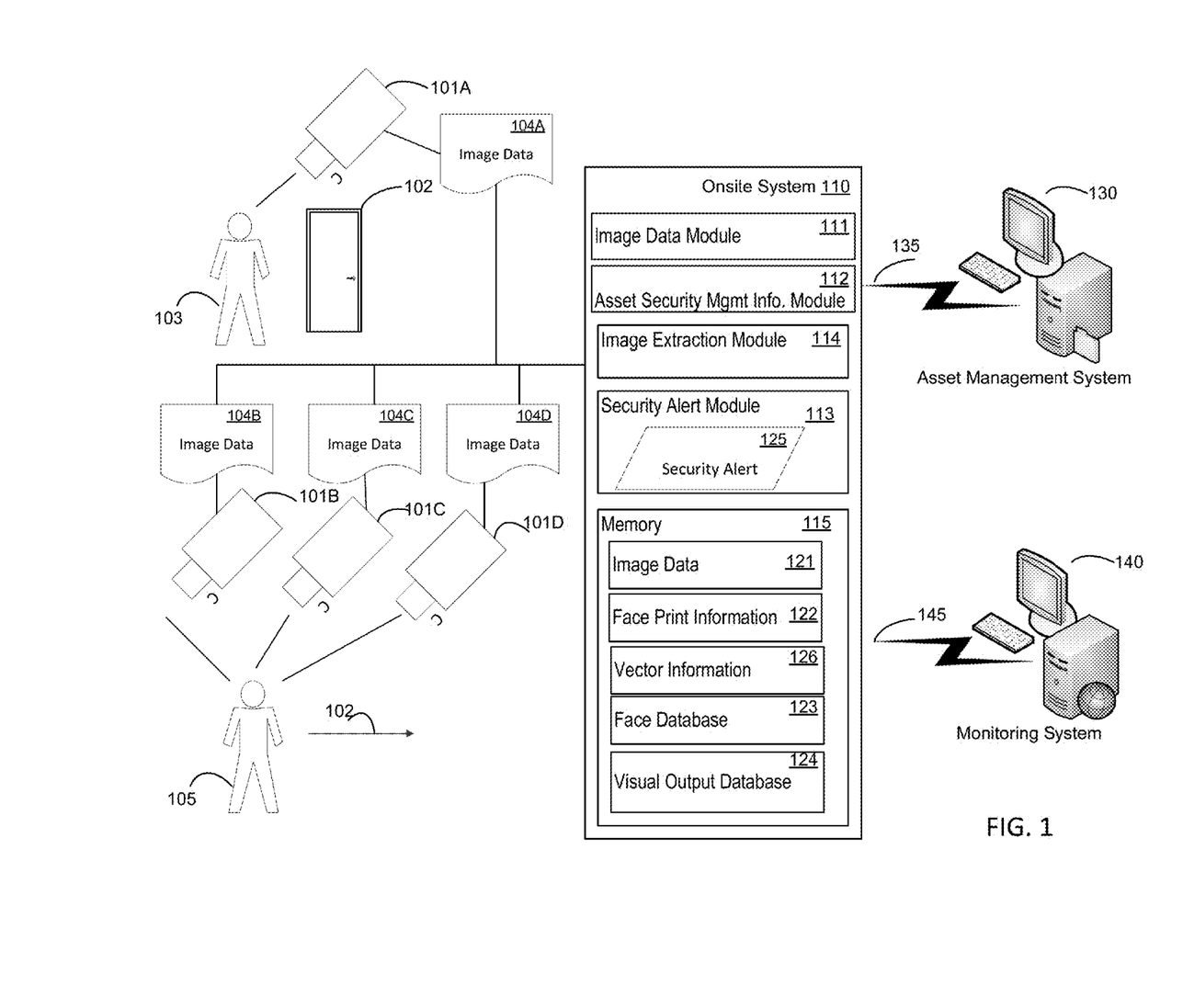
FIG. 1 is a diagram illustrating an operating environment for monitoring personnel according to certain embodiments.

Referring now to the drawings, FIG. 1 depicts an operating environment of premises under surveillance. Cameras 101A-101D located on the premises monitor areas such as entryway 102 to assets. Cameras 101A-101D may be capturing image data at all times or may be enabled in response to a command or detection of activity at the premises.

Cameras 101A-101D capture video as image data that is transmitted to onsite system 110. Onsite system 110 may be located on the premises. Along with the image data, cameras 101A-101D may transmit the time the image data was recorded and the location of the camera. FIG. 1 shows camera 101A monitoring entryway 102 so that the image of person 103 is captured as image data 104A as the person approaches entryway 102. Cameras 101B, 101C, and 101D, capture image data of person 105 as the person moves in the direction shown by arrow 102. Camera 101A sends to onsite system 110 image data 104A. Likewise camera 101B sends to onsite system 110 image data 104B, camera 101C sends to onsite system 110 image data 104C, and camera 101D sends to onsite system 110 image data 104D.

Onsite system 110 comprises image data module 111, asset security management information module 112, image extraction module 114, security alert module 113, and memory 115. As shown in FIG. 1, camera 101A monitors entryway 102 and sends the captured image data 104A to onsite system 110. The image data module 111 of onsite system 110 receives the image data 104A and may store it in memory 115 as image data 121. The image data module 111 analyzes the image data 104A received to detect faces of any person on image data 104A.

If a face is detected in the image data 104A by image data module 111, the image extraction module 114 extracts face print information 122 from the image data 104A received from camera 101A. The face print information 122 comprises a digital representation of the face. The digital representation of the face may be obtained by measuring nodal points of the face and determining a digital code which represents the face print. The face print information 122 uniquely identifies the individual on the image data 104A received from camera 101A. The face print information 122 comprises less than the amount of data comprising the image data of the face 104A or 121.

The image data module 111 may also detect and track movement of personnel from image data received. In FIG. 1, onsite system receives image data 104B-104D from cameras 101B-101D, respectively. When the image data module 111 receives multiple image data from one or more cameras, the image data module may compare the image data received to determine if the same face was captured by the different cameras. If the image data module 111 determines that the same face is captured in the different image data 104B-104D, the image data module 111 determines the location associated with each image data. The image data module 111 uses the locations to determine a vector that corresponds to a trajectory of movement of the person 105 as shown by the image data 104B-104D received. The recognition that the same face appears in the multiple image data may be determined by comparing the image data of the face from one image data to the image data of the face of another image data. Alternatively, the recognition of the same face may be performed by the image extraction module extrapolating face print information from each of the image data 104B-104D and comparing the face print information to determine if the same face appears in the multiple image data 104B-104D.

In another embodiment, the image extraction module 114 may identify a face on the image data, thereby identifying the person 103 or 105. The image extraction module may use the image data 121 or the face print information 122 and a face database 123 to identify the person 103 or 105. The face database 123 may contain image data of faces with identity information associated with each face. Instead or in addition to containing image data of faces, face database 123 may contain face print information of faces along with associated identity information for each face print information. By comparing the image data of the face to stored image data in face data base 123 or by comparing the face print information 122 to stored face print information in a face data base 123, the identity of the person associated with the face may be determined. Therefore, the onsite system 110 would have the face print information 122 and any information identifying the face such as name, position, contact information, authorization, etc.

The asset security management information module 112 of onsite system 110 receives asset management information regarding the status of any asset or equipment on the network that is associated with any location under surveillance by onsite system 110. Status information for any asset may comprise usage and event data specifying the usage of the resource provided by the asset and/or any event reported to the asset management system. Additionally, status information may include the time the usage or event information was gathered by the asset and/or the time it was received by the asset security management information module 112. Events may include but are not limited to power loss, suspected tampering, network time synchronization issues, meter failure, etc. Asset security management information may be received from any of the assets on the premises or may be received from asset management system 130. An asset management system 130 may be a head-end system or a meter data management system that controls and monitors a metering network. The asset management system 130 may be located at the premises with the onsite system or at a remote location.

The security alert module 113 of onsite system 110 correlates the face print information with asset management information. The correlation identifies associations between the face print information 122 and the asset management information. Associations may be made based on time, location, type of event received, identity of personnel, or any other factor that would correlate the face print information to the asset management information received. For example, asset security management information module 112 would receive asset management information gathered at time T for any assets located behind entryway 102. Asset management information received may indicate that a meter is not communicating at time T and intervention by personnel is required. The asset management information (meter outage) may be associated with a face print extracted by image extraction module from image data recorded at time T by camera 101A which monitors entry to assets behind entryway 102. Similarly, if asset management information received for assets behind entryway 102 do not disclose that any intervention by personnel is required and face print information from image data 115 recorded from camera 101A is received that reveals that a potential unauthorized entry by personnel 103 may be occurring, a correlation is made between the face print information and asset management information that would disclose a potential unauthorized entry to assets behind entryway 102.

Security alert module 113 generates a security alert 125 based on the correlation of the asset management information with the face print information 122. Additionally, if movement of personnel was tracked and a vector of the trajectory of movement was determined by image data module 111, the vector information 126 is included in the security alert 125 generated. The security alert 125 may include any information pertaining to the correlation. The information included in the security alert may include but is not limited to time, location, face print information, or asset management information. For example, security alert 125 may include the time the image data was recorded, the location or identity of the camera that recorded the image data, the location or identity of the premises under surveillance, the face print information along with any identity of the individual identified by the extracted face print information, and any usage or event data from any of the assets under surveillance. If movement of personnel was detected, the vector information 126 may also be included in security alert 125.

The security alert is transmitted by the security alert module 113 of onsite system 110 to a monitoring system 140. The security alert is transmitted via network 145 which is the communication network already deployed to reach devices on the smart grid. This communication network may be a narrowband network and the security alert would need to be configured in a size appropriate for transmission in the bandwidth of such a network.

Note that a utility network such as an Advanced Metering Infrastructure (AMI) network offers limited bandwidth for exchange of data. This limited bandwidth is most often incompatible with the transmission of video, photographs, full resolution images, etc. Typically the transfer of large files requires networks with bandwidth in excess of 1 MBPS. A utility network may be capable of peak exchanges at several tens or low hundreds of kbps. Representing images of faces or assets by a reduced number of points such as with face print information allows relevant information such as identification of personnel, movement of personnel, abnormal operation of a device, or any information relevant to the security of assets to be conveyed using less amount of data.

Security Alerts from Visual Output of Assets

Figure 2:
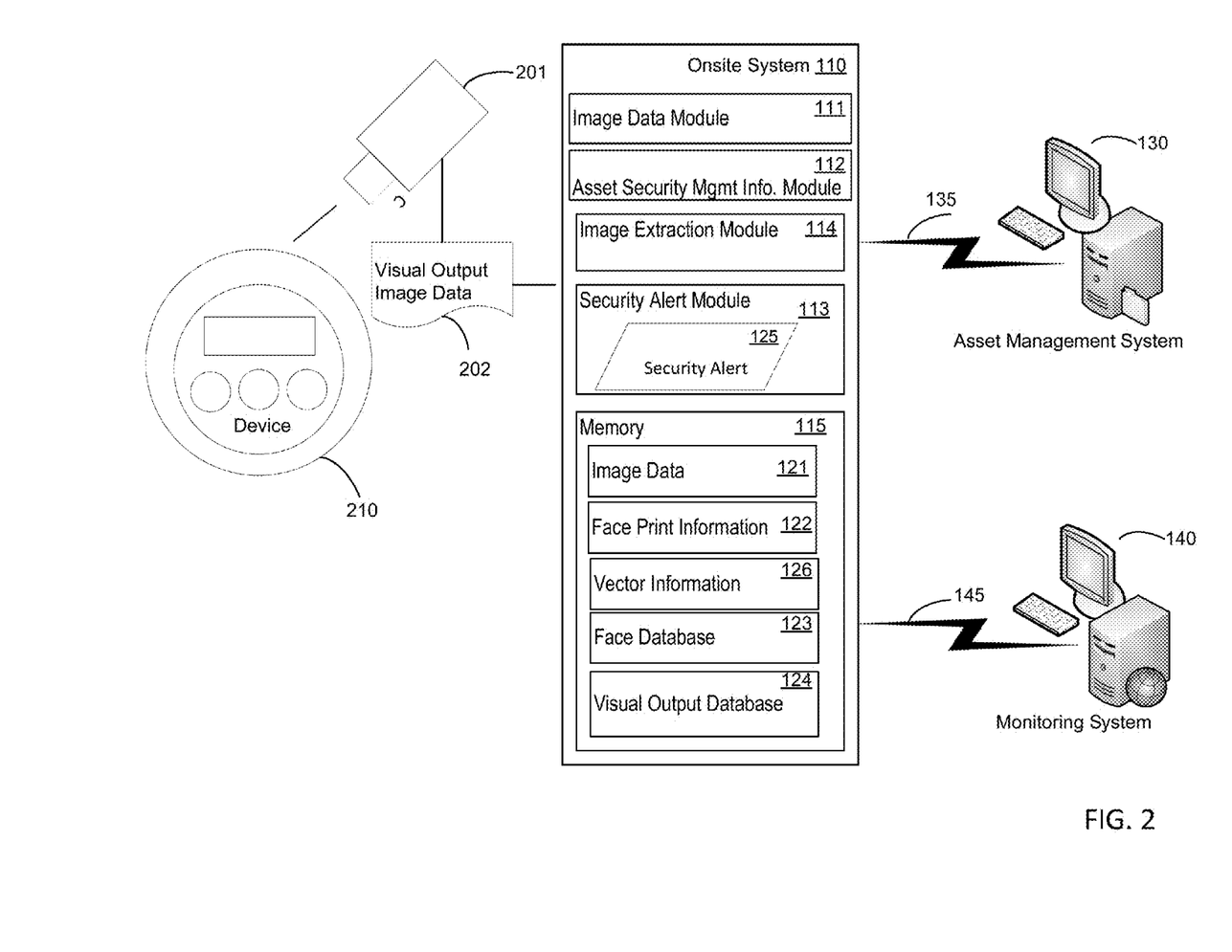
FIG. 2 is a diagram illustrating an operating environment for monitoring visual output of a device.

In another embodiment, shown in FIG. 2, camera 201 transmits the captured visual output of asset 210 as image data 202 to image data module 111 of onsite system 110. The onsite system 110 stores image data of the visual output of assets reflecting normal operations in visual output database 124. Therefore, visual output database stores image data for the visual output of device 210 that reflects normal operations of device 210. To determine abnormal operation, the image data module 111 compares the current visual output image data 202 received (visual output of device 210) to the stored image data reflecting normal operations of device 210 stored in visual output database 124. A threshold of normal operating conditions may be defined to determine the status of operation of device 210. The threshold may define by how much the visual output image data may deviate from stored visual output image data to determine abnormal or normal operation of device 210.

For example, in FIG. 2, the device 210 may be a utility meter providing a resource such as electricity. The stored image data stored in visual output database 124 for device

210 may include information about normal usage values for voltage, current, or frequency of the resource provided. The current visual output image data 202 received may also include information reflecting the current operating conditions for voltage, current, or frequency at the current time. Determining the abnormal operations of device 210 comprises comparing the visual output image data 202 to the stored image data in visual output database 124 based on thresholds defining tolerance levels for voltage, current, or frequency of the resource provided. The values defining tolerance levels may be represented numerically or by locations of meter gauges that reflect normal or abnormal operation.

If abnormal operation is determined, security alert 125 is generated by security alert module 113 comprising the results of the comparison. The amount of data for the results of the comparison is less than an amount of data for the image data 202 of the visual output of device 210. The security alert 125 generated from the results of the comparison is transmitted by the security alert module 113 of onsite system 110 to a monitoring system 140. The security alert is transmitted via network 145 which is the communication network already deployed to reach devices on the smart grid. This communication network may be a narrowband network and the security alert would be configured in a size appropriate for transmission in the bandwidth of such a network.

Alternatively or additionally, in visual output database 118, onsite system 110 may store data points of image data of the visual output of assets reflecting normal operations. The data points stored would reflect the minimal amount of information required to determine normal operation. The amount of data for data points being less than the amount of data for the image data 202 of the visual output of device 210. Image extraction module 114 would extract data points from image data 202 of the visual output of device 210. The data points extracted would be the minimal amount of information required to determine the status of operation reflected by image data 202. The amount of data for the data points is less than the amount of data for the image data 202. The data points extracted would be compared to data points stored in visual output database 124 for device 210 to determine abnormal operation. The security alert 125 would be generated from the results. The size of the security alert appropriate to be transmitted in the bandwidth of any network already deployed to reach devices on the smart grid.

Figure 3:
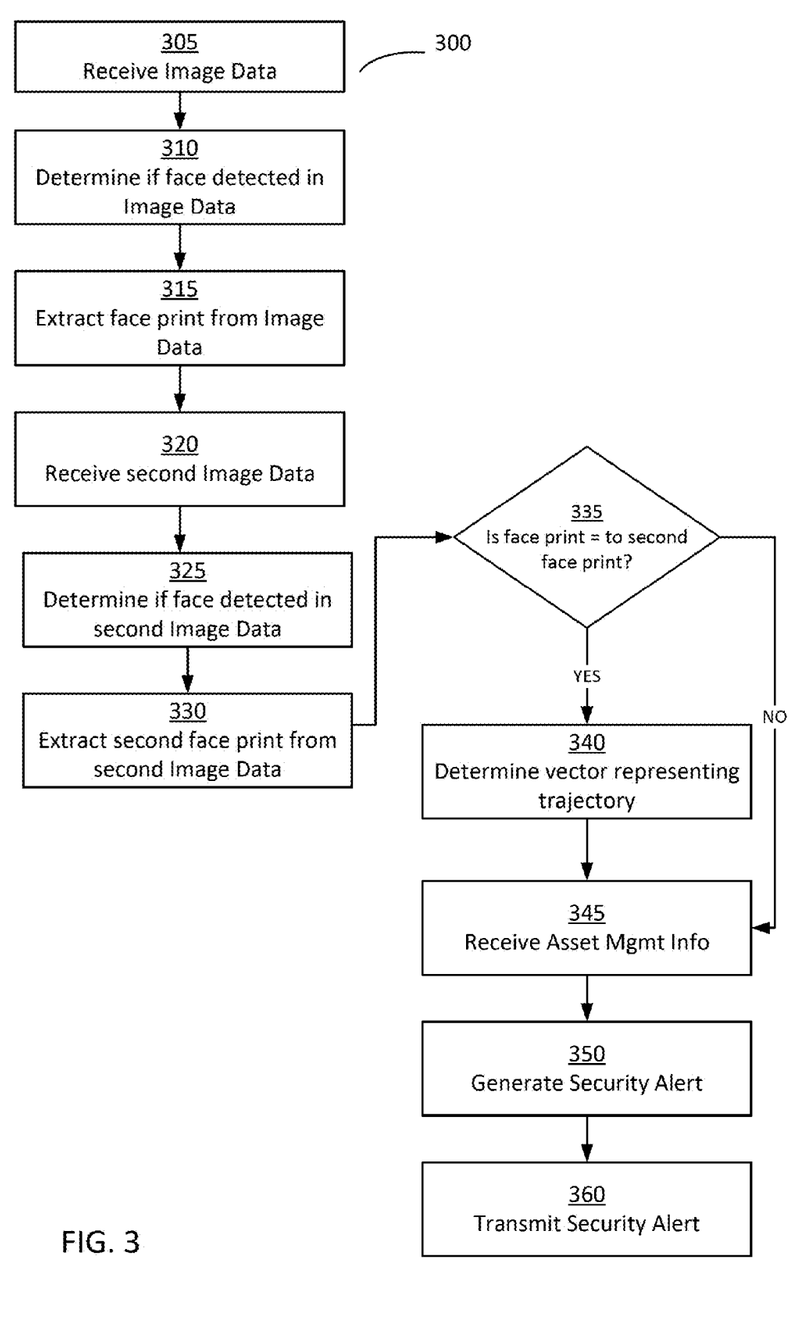
FIG. 3 is a flow chart illustrating a method for generating a security alert according to certain embodiments.

Referring next to FIG. 3, shown is a flowchart that provides one example of the generation of security alerts from the correlation of asset management information with face print information. It is understood that the method 300 shown by the flowchart of FIG. 3 provides an example of the different types of functional arrangements that may be employed to implement the generation of a security alert from face print information.

Beginning with block 305, the online system receives image data from one or more cameras located on the premises. The cameras located on the premises capture video or images of a location on the premises. The captured video or image is received by the onsite system as image data. In addition to image data, the onsite system may also receive location and time information associated with the image data. The time information may reflect the time the image data was captured. The location information may reflect the coordinates or identify a location where the image data was captured.

Continuing with block 310, the online system determines if a face is detected in the image data. If a face is detected in the image data, the onsite system extracts face print information from the image data of the face at block 315. The face print information comprising information less than the amount of data comprising the image data of the face received.

At block 320, the onsite system may receive image data from another camera. This second image data is analyzed to determine if a face is detected in the second image data at block 325. At block 330, the onsite system extracts face print information from the second image data. The face print information extracted comprises less information than the amount of data comprising the image data of the face received. At block 335, the face print information extracted from the first image data at block 315 is compared to the second face print information extracted from the second image data at block 330. If the comparison of the face print information reveals that it is the same face, at block 340, a vector representing the trajectory of movement of the face is determined.

The face print information extracted may be compared against face prints in a database to determine the identity of the face. The identity may include, for example, name, position, contact information, authorization, etc. If no match is made between the face print extracted and the face print information in the database, the onsite system may determine that an unauthorized personnel is on the premises. This information may be included when the security alert is generated at block 350

Continuing with block 345, the onsite system receives asset management information from an asset management system. Asset management information comprises any event, status, or usage information from any of the assets associated with any location being monitored by the onsite system.

At block 350, the online system generates a security alert. If the various face print information that have been extracted do not match and therefore no trajectory has been determined, a security alert is generated based on the correlation of the face print information and the asset management information received. The security alert may also include any time or location information associated with the face print information. Additionally, the onsite system may compare the face print information to a face database to determine an identity for the face, such as name, title, contact info, etc. The identity information may also be included in the security alert.

If a vector representing a trajectory has been determined at block 340, the vector information is correlated with asset management information to generate a security alert at block 350. The vector information would provide the direction of movement of a person. The vector information may be included in the security alert. However, once movement of a person is determined towards monitored assets, the security alert my contain information disclosing the movement of the person but does not necessarily have to include the vector. In this embodiment, the security alert would include a notification of movement by a person towards monitored assets. The security alert may also include time and location information. Additionally any identity identified for the face by comparing the face print information to face prints in a database may also be included in the security alert.

Continuing with block 360, the security alert is transmitted via a network that is already deployed to communicate with devices. This network may be a narrow band network and the security alert generated would be of a size and format necessary for transmission on such a network.

Figure 4:
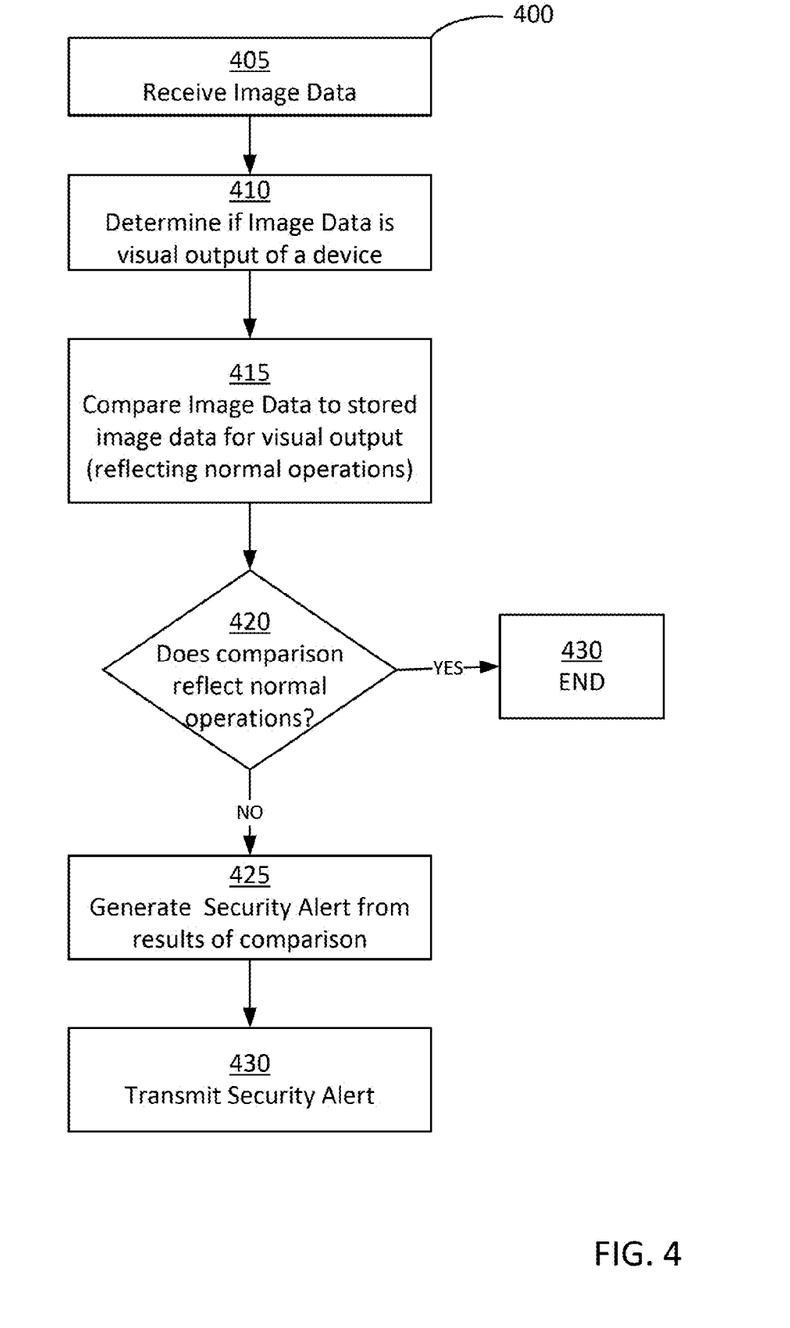
FIG. 4 is a flow chart illustrating a method for generating a security alert for visual output of a device.

Referring next to FIG. 4, shown is a flowchart that provides one example of the generation of security alerts from the visual output of a device. It is understood that the method 400 shown by the flowchart of FIG. 4 provides an example of the different types of functional arrangements that may be employed to implement the generation of a security alert from visual output information.

Starting at block 405, a camera monitoring a device sends image data of the visual output of the device to the onsite system. The onsite system at block 410 determines that the image data is visual output of a device.

Continuing with block 415, the image data is compared to stored image data for the device that reflects normal operations. If the comparison reveals that the image data reflects normal operation of the device, no action is taken by the onsite system as shown in block 430. If the comparison reveals that the image data reflects abnormal operation of the device monitored, a security alert is generated at block 425 including the results of the comparison. The amount of data for the results of the comparison is less than the amount of data for the image data received. This allows a security alert to be transmitted on a network with much less bandwidth.

Continuing with block 430, the security alert is transmitted on a network that is already deployed by the onsite system to communicate with devices on the grid. This network may be a narrow band network and the security alert generated would be of a size and format necessary for transmission on such a network.

General Considerations

These examples given are only for illustrative purposes and not meant to limit the invention to these devices. While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation and does not preclude inclusion of such modifications, variations, and/or additions to the present subject matter as would be readily apparent to one of ordinary skill in the art. In particular, the steps performed to generate a security alert do not necessarily have to be performed in the order specified. For example, the extrapolation of face print and the receiving of asset management information may occur in any order. The heading used are for organizational purposes only and are not meant to be used to limit the scope of the description. As used throughout this application, the word "may" is used in a permissive sense, meaning "having the potential to" rather than "must". Similarly, the words, "include", "including", and "includes" mean "including, but not limited to."

The invention claimed is:

1. A method comprising:
  receiving image data of a face recorded by a camera located on a premises;
  extracting face print information from the image data of the face, wherein the face print information includes a digital code that is less than an amount of data comprising the image data of the face;
  determining a first location associated with the image data;
  receiving a second image data of the face;
  determining a second location associated with the second image data;
  determining a vector that corresponds to a trajectory from the first location to the second location;
  receiving asset management information comprising usage and event data for devices on a narrowband network located at the premises;
  generating, by a processor, a security alert by correlating the asset management information with the face print information, wherein the security alert includes vector information for the vector; and
  transmitting in real time the security alert to a monitoring center over the narrowband network.

2. The method of claim 1, further comprising:
  comparing the image data of the face with stored image data to determine whether the face is associated with an authorized person.

3. The method of claim 1, wherein the event data comprises a tamper alert indicating tampering on one or more of the devices on the premises and wherein the security alert generated further comprises the tamper alert.

4. The method of claim 1, wherein the devices are utility assets and the usage data comprises information about delivery and consumption of a resource provided through at least one of the utility assets.

5. The method of claim 1, wherein the face print data further comprises a time corresponding to a time when the camera recorded the image data of the face.

6. The method of claim 1, wherein the image data of the face and the second image data of the face are recorded by different cameras on the premises.

7. The method of claim 1, wherein the camera is enabled in response to detection of activity at the premises.

8. The method of claim 1, wherein the asset management information is received from an asset security management system.

9. The method of claim 1, wherein the asset management information is received from devices on the narrowband network located at the premises.

10. The method of claim 1, further comprising:
  receiving current image data of a visual output of one of the devices located on the premises;
  determining abnormal operation of the one of the devices by comparing the current image data of the visual output to stored image data for a visual output of the one of the devices reflecting normal operation;
  generating, by the processor, an abnormal operation security alert comprising results of the comparison wherein an amount of data for the results of the comparison is less than an amount of data for the image data of the visual output; and
  transmitting in real time the abnormal operation security alert to the monitoring center.

11. The method of claim 10 wherein the one of the devices is a utility meter providing a resource, the stored image data comprises information about normal usage values for voltage, current, or frequency of the resource provided, and the current image data comprises information about present usage values for voltage, current, or frequency of the resource provided at a present time.

12. The method of claim 10, wherein determining abnormal operation of the one of the devices comprises comparing the current image data to the stored image data based on thresholds defining tolerance levels for voltage, current, or frequency of the resource provided.

13. A system comprising:
  a processor unit that includes a processor and processor unit memory, wherein the processor is operable to execute computer-executable instructions from the processor unit memory to:

receive image data of a face recorded by a camera located on a premises;

extract face print information from the image data of the face, wherein the face print information includes a digital code that is less than an amount of data comprising the image data of the face;

determine a location associated with the image data;

receive a second image data of the face;

determine a second location associated with the second image data;

determine a vector that corresponds to a trajectory from the location to the second location;

receive asset management information comprising usage and event data for devices on a narrowband network located at the premises;

generate, by a processor, a security alert by correlating the asset management information with the face print information, wherein the security alert includes vector information for the vector; and transmit in real time the security alert to a monitoring center over the narrowband network.

14. The system of claim 13, wherein the processor is further operable to:

receive current image data of a visual output of one of the devices located on the premises;

determine abnormal operation of the one of the devices by comparing the current image data of the visual output to stored image data for a visual output of the one of the devices reflecting normal operation;

generate, by the processor, an abnormal operation security alert comprising results of the comparison wherein an amount of data for the results of the comparison is less than an amount of data for the image data of the visual output; and transmit in real time the abnormal operation security alert to the monitoring center.

* * * * *